US011169665B2

(12) United States Patent
Hunter et al.

(10) Patent No.: US 11,169,665 B2
(45) Date of Patent: Nov. 9, 2021

(54) GAME CONSOLE USER INTERFACE WITH APPLICATION PREVIEWS

(71) Applicant: SONY INTERACTIVE ENTERTAINMENT INC., Tokyo (JP)

(72) Inventors: Nicholas R. Hunter, San Francisco, CA (US); Daisuke Kawamura, Foster City, CA (US); Katsuya Hyodo, San Mateo, CA (US); Kohichi Aoki, San Francisco, CA (US); Wivat Kruawongwanich, Pleasant Hill, CA (US); Toru Yamamoto, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/808,056

(22) Filed: Mar. 3, 2020

(65) Prior Publication Data
US 2021/0278934 A1    Sep. 9, 2021

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0483* (2013.01); *G06F 3/04817* (2013.01);
(Continued)

(58) Field of Classification Search
CPC .. G06F 3/0482; G06F 3/04817; G06F 3/0483; G06F 3/04842; G06F 2203/04803; H04L 61/3085
See application file for complete search history.

(56) References Cited

U.S. PATENT DOCUMENTS 9,412,236 B2 *   8/2016   Earley ................. G07F 17/3272
9,731,207 B2 *   8/2017   Guthridge ............... A63F 13/12
(Continued)

FOREIGN PATENT DOCUMENTS

| WO | 2014197340 A1 | 12/2014 |
| WO | 2015066658 A1 | 5/2015 |
| WO | 2019112631 A1 | 6/2019 |

OTHER PUBLICATIONS

PCT/US2021/019408, "International Search Report and Written Opinion", dated Jun. 1, 2021, 15 pages.
(Continued)

*Primary Examiner* — Tadesse Hailu
(74) *Attorney, Agent, or Firm* — Kilpatrick Townsend & Stockton LLP

(57) ABSTRACT

Techniques for previewing and presenting content of different applications in a user interface are described. In an example, a computer system determines a presentation template defined for a page application. The page application is configured to present a page about a target application, and the page includes a preview area and a body area. The system receives a user selection of an icon in a menu, whereby the icon corresponds to the target application. The system then presents in the user interface contents based on data stored in local memory, whereby the contents are presented according to an arrangement specified by the presentation template for the preview area. The system then receives a user request for additional information about the target application, and subsequently presents at least a portion of the body area of the page based on an execution of the page application.

22 Claims, 8 Drawing Sheets

(51) Int. Cl.
*G06F 3/0484* (2013.01)
*H04L 29/12* (2006.01)
*G06F 3/0483* (2013.01)

(52) U.S. Cl.
CPC ...... *G06F 3/04842* (2013.01); *H04L 61/3085* (2013.01); *G06F 2203/04803* (2013.01)

(56) References Cited

U.S. PATENT DOCUMENTS

| | | |
|---|---|---|
| 9,761,035 B1 | 9/2017 | Flores |
| 10,290,133 B2* | 5/2019 | Straub .................... G06T 11/60 |
| 10,460,023 B1* | 10/2019 | Shriver ................ G06F 3/0486 |
| 2006/0286534 A1* | 12/2006 | Tillis ........................ G09B 3/00 |
| | | 434/350 |
| 2007/0094698 A1* | 4/2007 | Bountour ............... H04N 7/181 |
| | | 725/132 |
| 2009/0019349 A1* | 1/2009 | Lee ........................ G06Q 30/02 |
| | | 715/205 |
| 2009/0031215 A1* | 1/2009 | Collier, II ............. G06F 40/186 |
| | | 715/255 |
| 2009/0037821 A1 | 2/2009 | O'Neal et al. |
| 2009/0046584 A1* | 2/2009 | Garcia .................. G06Q 30/02 |
| | | 370/233 |
| 2011/0196752 A1 | 8/2011 | Paulik et al. |
| 2012/0079418 A1 | 3/2012 | Lindsay et al. |
| 2012/0089933 A1 | 4/2012 | Garand et al. |
| 2014/0019847 A1* | 1/2014 | Osmak .................. G06F 40/174 |
| | | 715/234 |
| 2014/0089826 A1* | 3/2014 | Boyd .................... G11B 27/031 |
| | | 715/765 |
| 2014/0195921 A1* | 7/2014 | Grosz ................ G06Q 30/0601 |
| | | 715/738 |
| 2014/0229821 A1* | 8/2014 | Abrahami ............... H04L 67/20 |
| | | 715/235 |
| 2015/0120744 A1* | 4/2015 | Horn ....................... G06F 16/10 |
| | | 707/740 |
| 2016/0103601 A1* | 4/2016 | Steinfl ................. G06F 3/04842 |
| | | 715/202 |
| 2017/0300459 A1 | 10/2017 | Luo et al. |
| 2017/0308518 A1* | 10/2017 | Sjolander .............. G06F 40/186 |
| 2017/0329500 A1 | 11/2017 | Grammatikakis et al. |
| 2018/0295421 A1* | 10/2018 | Lim .................... H04N 21/4222 |
| 2018/0300020 A1* | 10/2018 | Dyar ..................... G06F 3/0484 |
| 2019/0050378 A1 | 2/2019 | Novak et al. |
| 2019/0050440 A1 | 2/2019 | Novak et al. |

OTHER PUBLICATIONS

PCT/US2021/019415, "International Search Report and Written Opinion", dated Jun. 7, 2021, 13 pages.
PCT/US2021/019430, "International Search Report and Written Opinion", dated Jun. 4, 2021, 19 pages.

* cited by examiner

GAME CONSOLE USER INTERFACE WITH APPLICATION PREVIEWS

BACKGROUND

Graphical user interfaces (GUIs) are the predominant type of interfaces available to users for interacting with computer systems. A GUI is operable to present information and functionalities available from the computer systems.

In an example, a GUI is used for video games or other media applications. In particular, a user operates a computing device, such as a video game console, that presents the GUI as a page. The GUI shows different pages associated with different video game or media-related applications. Each page may display different types and amounts of information and/or functionalities. A user may browse through different pages related to the different applications, for example, by navigating through a menu of icons corresponding to the different applications.

There is a need for improved GUI responsiveness, for example, when navigating between pages related to different applications.

BRIEF SUMMARY

Techniques for previewing and presenting content of different applications in a user interface (UI) are described. In an example, a computer system is used for presentation of video game or other media application-related information. The computer system includes one or more processors and one or more non-transitory computer readable storage media (e.g., one or more memories) storing instructions that, upon execution by the one or more processors, cause the computer system to perform operations.

In an example, the operations include determining a presentation template defined for a page application. The page application is configured to present a page about a target application, and the page includes a preview area and a body area. The presentation template specifies types and an arrangement of content to present in the preview area. The target application is a user application of the computer system or a system application of the computer system. The operations further include storing, in local memory of the computer system, data about the target application. The data includes contents of the target application or uniform resource identifiers (URIs) of the contents, and the contents are of the types specified by the presentation template for the preview area. The operations then include presenting, in the user interface and based on an execution of a menu application of the computer system, a menu that includes icons corresponding to target applications. Upon presenting the menu, the operations include receiving a user selection of an icon that corresponds to the target application. The operations further include presenting, in the user interface and in response to the user selection, the contents based on the data stored in the local memory. The contents are presented according to the arrangement specified by the presentation template for the preview area. Upon presenting the contents in the preview area, the operations then include receiving a user request for additional information about the target application, and then presenting, in the user interface and in response to the user request, the body area of the page. The body area may be presented based on an execution of the page application.

In an example, the operations include presenting the contents in the preview area. In this example, the preview area and the menu are presented simultaneously in the user interface. In another example, the operations include removing, in response to the user request, the menu from the user interface. In this example, the body area is presented in the user interface while the menu is removed from the user interface.

In an example, the operations corresponding to presenting the contents further includes retrieving, by the menu application, the contents based on the data. In this example, the menu application then presents a window at a location in the user interface corresponding to the preview area. The window includes the contents.

In an example, the operations further include retrieving, by the page application in response to the user request, the contents based on the data and additional contents for the body area. In this example, the body area is presented by the page application by populating the body area with the additional contents. The operations further include receiving a second user request for the preview area. The operations then include presenting, by the page application in response to the second user request, the preview area at the location in the user interface, whereby the preview area includes the contents. The menu application also presents the menu in the user interface simultaneously with the presentation of the preview area.

In an example, the operations corresponding to presenting the contents further include retrieving, by the page application in response to the user selection, the contents based on the data. The operations then include presenting the preview area by the page application. In this example, the preview area includes the contents. In one example, the data is stored by the page application prior to receiving the user selection. In this example, the operations may further include retrieving, by the page application in response to the user request, additional contents from one or more content sources. The body area is presented by the page application by populating the body area with the additional contents.

In an example, the menu includes a second icon corresponding to a second target application that is associated with a second page application. In this example, the second page application is configured to present a second page about the second target application. In one example, the operations further include storing, in the local memory, second data of the second target application. The second data includes second contents or second URIs of the second contents. The operations further include receiving a second user selection of the second icon. The operations then include retrieving the second contents based on the second data, and then presenting, in the user interface, the second preview area comprising the second contents. In one example, the second data is stored based on a second presentation template that is defined for the second page application and that is different from the presentation template defined for the page application. In this example, the second contents are presented in the second preview area according to the second presentation template. Also, in this example, the target application and the second target application are of different application types.

In an example, the menu includes sets of icons. In this example, each set of icons corresponds to a different application type. A first set of the sets corresponds to a first application type and includes the icon based on the target application being of the first application type. Also, in this example, the page application is configured to present a set of pages each of which corresponding to a different target application. In one example, the preview area is presented by the page application based on the user selection of the icon. In this example, the body area is presented by the page application based on the user request for the additional information. Also, in this example, the operations further include receiving a second user selection of a second icon that is included in the first set presented in the menu. The operations further include presenting, by the page application, a second preview area of a second page that corresponds to a second application. In this example, the second application is of the first application type. In one example, the second preview area is presented according to the presentation template.

In an example, the operations further include receiving a second user selection of a second icon that is included in a second set presented in the menu. In this example, the second set corresponds to a second application type. The operations further include presenting, by a second page application, a second preview area of a second page that corresponds to a second application, the second application being of the second application type.

In an example, the icon corresponds to a plurality of target applications. In this example, the presentation template is defined for the plurality of target applications. Also, in this example, the page application presents the preview area by populating the preview area with information about the plurality of target applications based on the presentation template.

In an example, the contents are presented in the preview area. In this example, the preview area and the menu are presented simultaneously in the user interface. Also, the body area is presented in the user interface while the menu is removed from the user interface.

In an example, the data is stored by the page application prior to receiving the user selection. In this example, the operations may further include retrieving, by the page application in response to the user selection, the contents based on the data. The operations may further include presenting, by the page application, the preview area. The preview area includes the contents. The operations further include retrieving, by the page application in response to the user request, additional contents from one or more content sources. In this example, the body area is presented by the page application by populating the body area with the additional contents.

In an example, the menu includes a second icon corresponding to a second target application that is associated with a second page application. In this example, the second page application is configured to present a second page about the second target application.

In an example, the page is one of plurality of pages associated with the target application. Also, the preview area is presented in response to the user selection as including the contents and excluding selectable tabs. In this example, the operations further include determining a trigger event. The trigger event includes at least one of: a user navigation to the body area and back to the preview area, or an elapse of a predefined time period. The operations further include presenting the selectable tabs within the preview area based on the trigger event. Each tab respectively corresponds to navigable links to a particular page of the plurality of pages. The operations further include receiving a second user request corresponding to a selection of a tab, and then presenting, in the user interface and in response to the second user request, a second body area of a second page of the plurality of pages.

In an example, the operations further include presenting a plurality of selectable tabs within the menu. Each selectable tab corresponds to a target application category. The target application category is at least one of games or media. The operations further include receiving a second user selection for one of the plurality of tabs, the selected tab corresponding to a particular target application category. The operations further include presenting, in the menu, a subset of the icons. The subset corresponds to target applications having the particular target application category.

DETAILED DESCRIPTION

Figure 1:
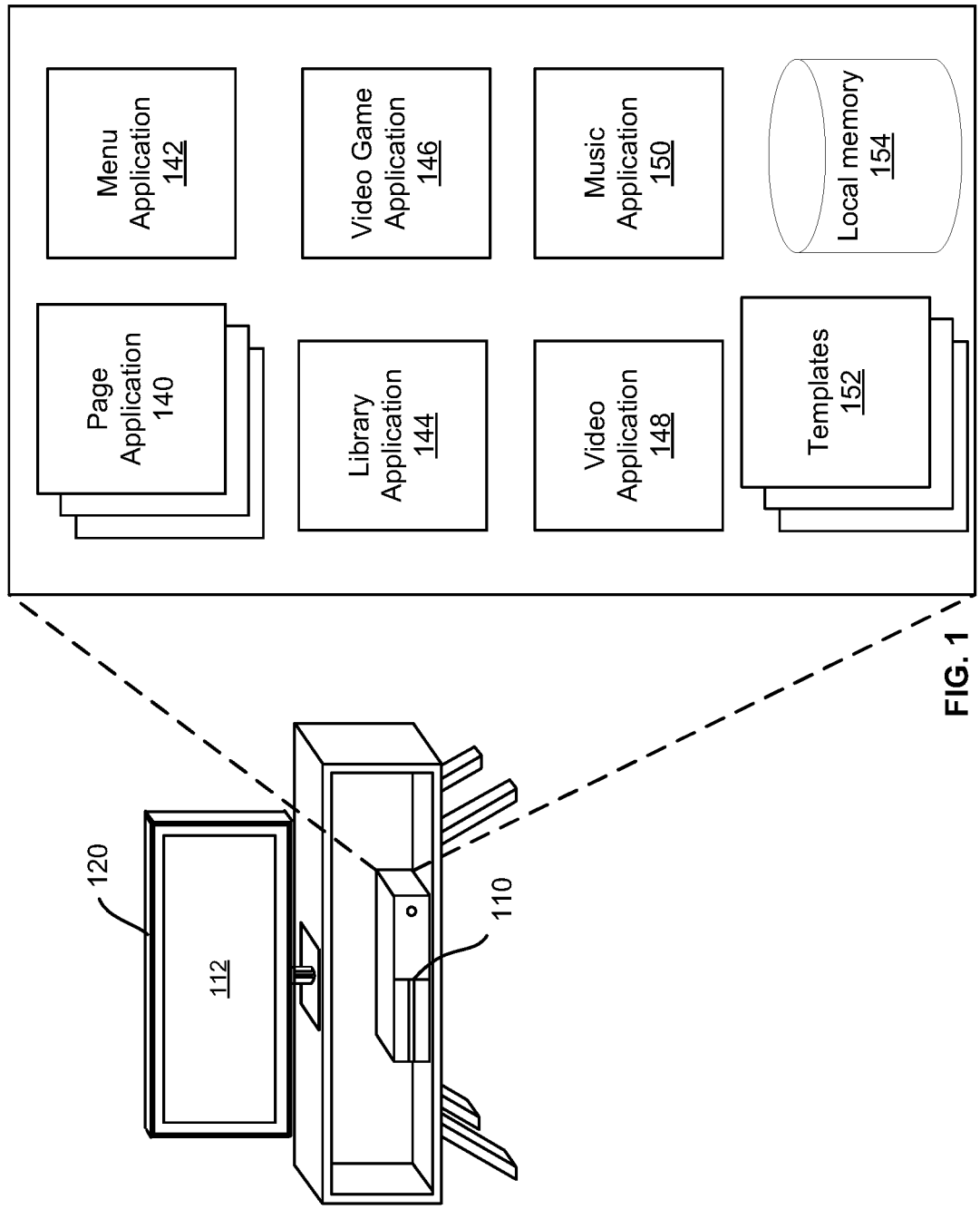
FIG. 1 illustrates an example of a computing environment for presenting a page about a target application, according to an embodiment of the present disclosure.

Generally, systems and methods for previewing and presenting content of different applications in a user interface are described. In an example, a computer system presents a GUI on a display to a user. The GUI includes a menu that presents icons corresponding to target applications (e.g., video game applications, video applications, etc.). The system receives input indicating a user selection (e.g., a click) of an icon corresponding to a target application, and then retrieves (e.g., loads) data that includes contents based on a presentation template. The presentation template defines types and arrangements of the contents to be presented within a preview area of a page about the target application displayed within the GUI. In this example, prior to the computer system displaying the menu and/or receiving the user selection of the icon, the system may have pre-fetched the data from one or more sources that includes the contents to be stored in local memory on the system. The system then presents the contents within the preview area of the page as specified by the presentation template. Subsequently, the system may receive a user request for additional information about the target application. A page application associated with the page then presents the additional information within a body area of the page. By partitioning the presentation of the page between the preview area and the body area, whereby the contents of the preview area are constrained by a predefined presentation template, the system may reduce latency for presenting content within the GUI and improve GUI responsiveness. The system may also improve GUI responsiveness based on pre-fetching the data including contents to be stored in local memory on the system. In this way, the system may quickly retrieve from local memory (e.g., not over a network) the contents that are used to present the preview area defined by the presentation template.

To illustrate, consider an example of a process for generating and displaying at least a portion of a page about a target application (e.g., a video application) within a GUI. As discussed herein, a page may include at least two portions: the preview area and the body area. Each portion of the page may include one or more elements, including, for example, textual content, thumbnails of video clips, a poster image, game statistics, links to other pages, etc. The system may receive an indication of a user selection of an icon (e.g., in a menu of icons) that corresponds to the target application associated with the page. The user selection may correspond to a browsing (e.g., navigation) process whereby the user browses through pages respectively associated with different target applications by scrolling through different icons in the menu. Upon receiving the user selection for the specific icon, instead of processing (e.g., loading) data for presenting the entire page (which may include, for example, links/thumbnails for many video clips), the system may load and present (e.g., render) within a viewing area of the GUI only the data contents that are specified by a presentation template for a preview area of the page. It should be understood that the amount and/or type of data loaded for presentation within the preview area of the page may be constrained by the presentation template, as discussed herein. Additionally, the presentation template may indicate what data that is required for presentation of the preview area should be pre-fetched (e.g., retrieved) and stored in local memory on the system. The pre-fetching may occur at any suitable time, for example, after booting the system and/or logging in the user, and prior to receiving the user selection of the icon. Accordingly, the time required for rendering the preview area of the page upon receiving the user selection may be significantly reduced (e.g., compared to the time required for loading and/or rendering the entire page, including the content for the body area). Also, by pre-fetching the data for the preview area based on the presentation template, the time required to render the preview area may be further reduced, at least because minimal (e.g., none) network communications are required. Subsequent to presenting the contents for the preview area, the user system may receive a user request (e.g., an indication of one or more clicks corresponding to scrolling through the page). For example, the user may see an item of interest within the preview area and decide to interact with the displayed page. Upon receiving the user request, the system may retrieve additional data associated with a body area of the page. The system may then render at least a portion of the body area of the page by presenting, within the viewing area of the GUI, contents included within the additional data (e.g., links/thumbnails for video clips that were not included data previously loaded for display in the preview area of the page).

Embodiments of the present disclosure provide many technical advantages over existing computer systems. For instance, existing computer systems typically will load a landing page, upon receiving a user selection (e.g., while browsing icons in a menu). After rendering the landing page, conventional systems may then load a remainder of the page. However, the content for a conventional landing page may not be constrained by a presentation template that specifies a type and/or arrangement of contents. Additionally, the data contents that are retrieved for the landing page, based on the presentation template, may not be pre-fetched and stored in local memory on the system in advance of receiving the user selection. This may lead to an increased latency between the time the system receives the user selection (e.g., of an icon) and the presentation (e.g., rendering) of a page within a GUI. This may reduce user satisfaction when interacting with the computer system. In contrast, embodiments of the present disclosure reduce the latency for presenting content within a GUI and increase GUI responsiveness to user input. For example, by using predefined presentation templates to define a type and/or amount of content that may be displayed within a preview area of a page, the computer system may reduce the latency for displaying the preview area of a page within the GUI (e.g., by not having to additionally process (e.g., load) contents within the body area of the page at the time of preparing to render the preview area). By partition the page into two portions (e.g., the preview area and the body area), whereby each portion is rendered in a separate phase, and by constraining the content displayed within the preview area by predefined presentation templates, the computing system may reduce latency. Additionally, as described above, the latency for displaying the preview area may also be reduced based on the data for the preview area being pre-fetched into local memory of the system, based on the content definitions specified by the presentation template. Also, as a user may quickly navigate between icons within a menu of the GUI, the system may responsively display a new preview area corresponding to a presently selected icon. Hence, a seamless and responsive user experience is provided by the computing system. Further, the computational burden and overhead is significantly reduced. Rather than having to load an entire page for each navigation between icons in a menu, loading only the preview area of a page may be sufficient. The computing system can thus be optimized for the shortest possible latency and best possible user interface reactivity to user interactions with the GUI.

FIG. 1 illustrates an example of a computing environment for presenting a page about a target application, according to an embodiment of the present disclosure. As illustrated, the computing environment includes a computer system 110 (e.g., a video game console) communicatively coupled with a display 120 (e.g., over a communications bus) that displays a GUI 112. Although not shown, the computer system may also be communicatively coupled with a service platform (e.g., a video game platform), discussed further herein. The computer system 110 may also be communicatively coupled with an input device (e.g., a video game controller (not shown)). As described herein, a "page" may also be referred to as a "hub page." A hub page may be so designated because the hub page presents information that is retrieved from different sources (e.g., third-party content providers, etc.). This information may enable interaction with different functions of a target application (e.g., a video game application, video application, etc.) and/or multiple target applications, and thereby the hub page may be used as a hub perceive and access the different functionalities (different game levels, game add-ons, trophies, online tournaments, video game store, etc.). Similarly, as described herein, a "page application" may also be referred to as a "hub application." The hub application may be configured to present a hub page about a target application, which in turn enables access to different functionalities of the target application. In another example where the target application may be a video streaming application, the hub application may show titles owned by the user, a history of watched titles, titles available for free from one source, rentable titles, etc.

The computer system 110 includes a processor and a local memory 154 (e.g., including a non-transitory computer-readable storage medium) storing computer-readable instructions that can be executed by the processor and that, upon execution by the processor, cause the computer system 110 to perform operations related to various applications. In particular, the computer-readable instructions can correspond to the various applications of the computer system 110 including one or more page (e.g., hub) applications 140, a menu application 142, a library application 144, a video game application 146, a video application 148, a music application 150, and one or more presentation templates 152. Each of such applications 140-150 can be defined as program code that can be executed as a standalone (e.g., user) application or as part of a system application or an operating system application. As described herein, the local memory 154 includes various types of storage medium that are local to the device (e.g., the video game console). For example, the local memory 154 may include both permanent storage media (e.g., a hard disk drive (HDD), flash memory (SSD)), and non-permanent storage media (e.g., non-transitory storage medium such as random access memory (RAM) (e.g., static RAM (SRAM), dynamic RAM (DRAM)). The computer system 110 may periodically communicate with the service platform, for example, to download updated data (e.g., updated presentation templates 152) for one or more of the applications (e.g., hub application(s) 140 and/or menu application 142) and store the data in the local memory 154 (e.g., store to HDD or RAM). In some embodiments, the computer system 110 may correspond to a cloud computing system. Accordingly, it should be understood that some or all of the features of the present disclosure may be performed by a cloud computing system. In this case, some or all of the technical improvements described herein can be achieved via the cloud computing system (e.g., improving GUI responsiveness by reducing latency when rendering the GUI 112, for example, to display 120).

The video game controller is an example of an input device. Other types of the input device are possible, including, a keyboard, a touchscreen, a touchpad, a mouse, an optical system, or other user devices suitable for receiving input of a user.

In an example where the computer system 110 is a video game console, a user (e.g., a video game player) operates the video game controller to interact with the video game console 110. These interactions may include playing a video game presented on the display 120 and interacting with other applications (e.g., media applications, system applications, etc.) of the computer system 110. For example, the video game console 110 may be initially booted and/or logged-in upon receiving input (e.g., a signal) from the user to log-on. Upon logging in the user, the video game console 110 may execute the menu application 142 to display a menu in the GUI 112. The menu may include one or more icons, whereby each icon may correspond to a target application (e.g., one of applications 144, 146, 148 or 150). In some embodiments, in addition to displaying the menu (e.g., at the top of GUI 112), a page application 140 concurrently executing on the video game console 110 may also display in the GUI 112 a preview area of a page. (e.g., a hub page). In some embodiments, the preview area and the menu including icons may be concurrently displayed in the GUI 112. The hub page may include contents about a target application, for example, a particular target application (e.g., video game application 146) corresponding to an icon currently selected within the menu displayed in GUI 112. The page application 140 may display the preview area of the hub page for video game application 146 by first loading a presentation template 152. The presentation template 152 may indicate types and/or arrangements of contents (e.g., a poster image, thumbnails for video clips from the video game, text corresponding to information about the game, etc.) that should be displayed within the preview area of the hub page. After the page application 140 loads the presentation template 152 for the preview area into local memory 154 (e.g., RAM), the page application 140 may then fetch (e.g., retrieve) contents for the preview area into local memory 154 and then render the contents within the GUI 112, as defined by the presentation template 152. In some embodiments, as described further below, a service executing on the system (e.g., a content monitoring computing service (CMCS)) may pre-fetch contents for the preview area into the local memory 154 (e.g., a HDD, Flash memory, etc.) even before receiving input from an input device (e.g., to select an icon in the menu). As described above, the service may pre-fetch the contents (e.g., from different sources) based on the presentation template 152. For example, a video title text content for the preview area may be pre-fetched from one third-party source and stored in the local memory 154, while a cover image for the video may be pre-fetched from another source and stored in the local memory 154. As video game console 110 may receive input to navigate (e.g., scroll, click, etc.) between icons in the menu that are displayed in a GUI 112 of the display 120, different page applications (e.g., respectively corresponding to the icon currently selected) may execute and load preview areas of pages for respective target applications according to the presentation template for the particular page application. If the video game console 110 receives further input (e.g., scrolling down the page) for more information about a target application, as described further herein, the page application may further retrieve and then render additional contents for a body area of the page.

In some embodiments, as described above, a CMCS may reside as a service executing on the video game console 110. In some embodiments, the CMCS may execute in the menu application 142, in one of the page applications 140, or elsewhere as a system service executing on the video game console 110. The CMCS may be responsible for performing functions related to fetching (e.g., pre-fetching) contents from different sources and storing them in the local memory 154. For example, the CMCS may execute within the menu application 142 and may periodically fetch contents for the preview area of the page from different sources based on a predetermined time interval (e.g., once per minute, per hour, per boot-up, per log-in, etc.), or other suitable trigger event. As described herein, this fetching (e.g., pre-fetching) may occur even before a menu and/or hub page is presented in the GUI 112. In some embodiments, the CMCS may fetch both presentation templates for the preview area and/or contents that are defined by the presentation templates. In some embodiments, subsequent to CMCS the storing of contents for the preview area in local memory 154, either the menu application 142 or the page application 140 may then render the preview area by loading the contents from the local memory 154 and presenting the preview area in the GUI 112. As discussed further herein, subsequent to displaying the preview area by loading contents from local memory 154, the page application 140 may fetch, in real-time, content for the body area of the page as needed.

Figure 2:
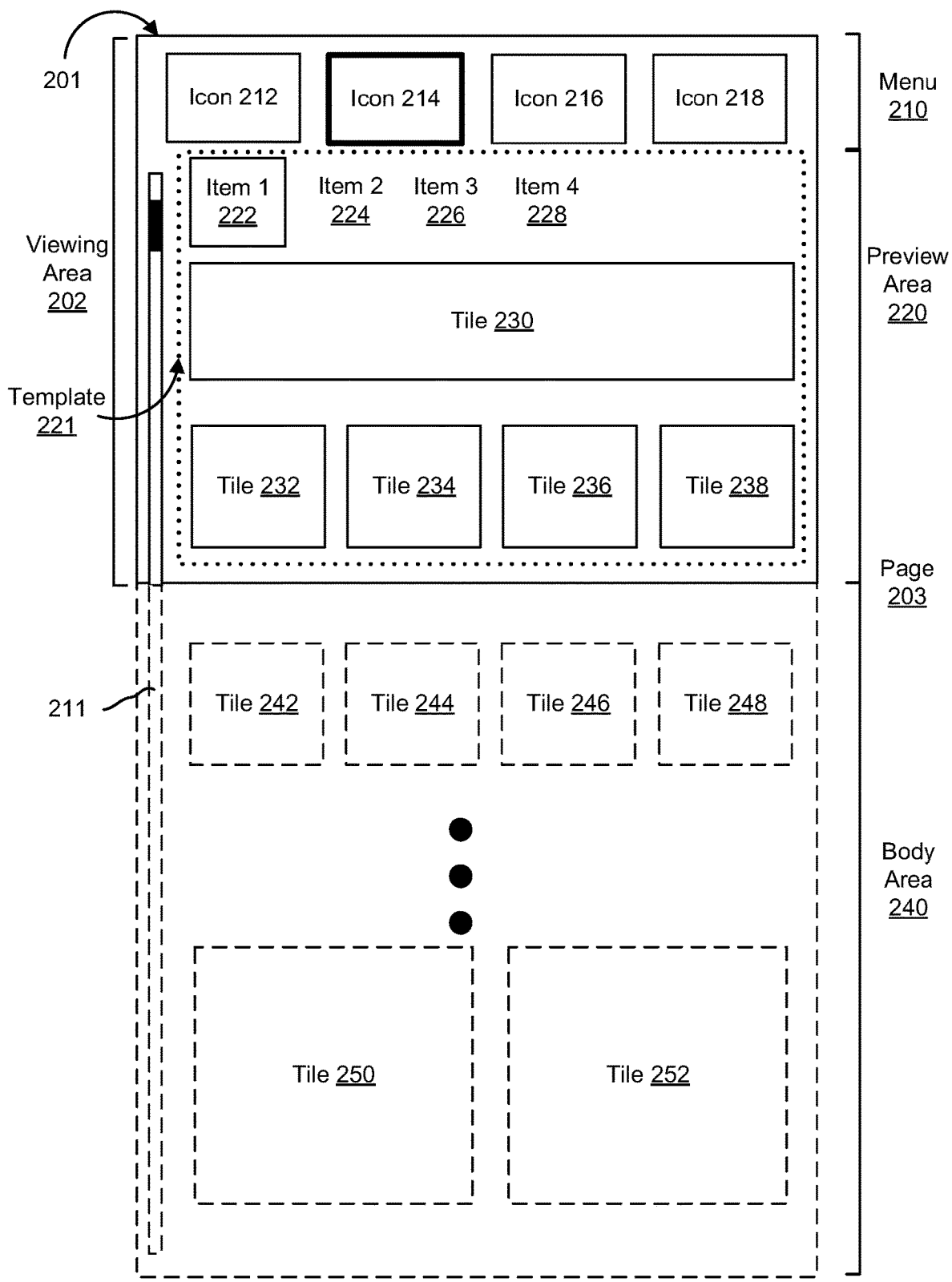
FIG. 2 illustrates an example of a computer system that presents a portion of a page, according to an embodiment of the present disclosure.

FIG. 2 illustrates an example of a page as presented on a GUI 201, according to embodiments of the present disclosure. The GUI 201 includes a viewing area 202, such as a presentation area that can be viewed by a user. The GUI 201 may be similar to GUI 112 that is presented on display 120 of FIG. 1. In some embodiments, a menu 210 may be presented within the viewing area 202. In addition to the menu 210, at least a portion of a page 203 may also be presented within the viewing area 202. As discussed further herein, the menu 210 and/or portions of the page 203 may be presented in the GUI 201 concurrently (e.g., simultaneously) or non-concurrently. As depicted in FIG. 2, the page 203 has a presentation area that is larger than the viewing area 202. Accordingly, the page may be organized to be scrollable as indicated with scroll bar 211. Additionally, the page 203 may be divided into two separate portions: a preview area 220 and a body area 240. The preview area 220 may include a portion of the page 203 that is initially loaded and visible within the viewing area 202. The body area 240 may include a portion of the page not represented by the preview area 220 (e.g., not initially loaded and/or visible upon initially loading and presenting the preview area 220 of page 203 (represented in FIG. 2 by dashed lines under the preview area 220)).

Turning to the menu 210 in further detail, the menu 210 may include one or more icons. For example, as depicted in FIG. 2, the menu 210 includes icon 212, icon 214, icon 216, and icon 218. The menu 210 may be presented to the GUI 201 based on an execution of a menu application (e.g., which may be similar to menu application 142 of FIG. 1). Each icon may correspond to a target application. For example, the icon 212 may correspond to library application 144 and the icon 214 may correspond to the video game application 146. In some embodiments, more than one icon may correspond to the same target application. For example, the icon 216 and the icon 218 may both correspond to a video application 148. In one example, the icon 216 may be associated with a first set of features of video application 148 (e.g., playing movies), while the icon 218 may be associated with a second set of features of video application 148 (e.g., playing livestream TV shows). In some embodiments, one of the icons in the menu 210 may be selected, whereby the selection may be indicated by a visual indicator. For example, the icon 214 is depicted as being currently selected via a highlight indicator around the perimeter of the icon. As discussed further herein, in some embodiments, the icon currently selected may determine the page 203 that is currently displayed within the viewing area 202.

In some embodiments, the menu 210 may also include one or more selectable tabs. Each selectable tab may correspond to a target application category (or type) (e.g., "Games" or "Media"). In some embodiments, the selectable tabs (not shown in FIG. 2) may be presented above the icons in the menu 210. Upon the system receiving a user selection for one of the selectable tabs, the system may present a subset of the icons to the GUI 201 (e.g., the icons 216 and 218, but not the icons 212 and 214). In this way, the system may allow a user to hierarchically navigate a listing of various applications on the system according to the type of application. It should be understood that, as discussed herein, selectable tabs and icons may be presented in any suitable form. For example, selectable tabs may correspond to clickable links, buttons, or other visual indicators. Also, icons and/or selectable tabs may be displayed in any suitable location. For example, as depicted in FIG. 2, the icons may be displayed horizontally, near the top of the viewing area 202. In an embodiment where selectable tabs are also presented in the GUI 201, the selectable tabs may also be presented horizontally above the icons (e.g., at the top of the GUI 201). In another embodiment, the icons and/or selectable tabs may be displayed vertically in the viewing area 202.

In some embodiments, a first set of elements of the menu 210 (e.g., all the icons and selectable tabs) may be presented upon initially loading a preview area 220 of a page 203 upon initially logging in the user. However, as discussed further herein (e.g., FIG. 3), in some embodiments, upon receiving further input (e.g., a user request corresponding to scrolling down and/or up), a subset of the first set of elements (e.g., icons) of the menu 210 may be displayed. In some embodiments, new (or updated) elements within the menu 210 may be displayed.

In some embodiments, the system may receive different types of input requests from the input device. The system may perform a particular action based on the type of input request and/or the element being selected. For example, in one embodiment, the input device may receive input corresponding to an icon click (e.g., clicking the icon 216) within the menu 210. In this case, the system may immediately launch a target application (e.g., the video application 148). In another embodiment, the icon click within the menu 210 may not launch the target application immediately, but instead may navigate to the preview area 220 of the page 203, discussed further below. In another case, instead of receiving an indication of a click from the input device, the system may receive an indication of a scroll (or other type of input). In this case, the system may navigate the user to the preview area 220 of the page 203. In any case, once the system focus is on a particular selectable element within the preview area 220 (or body area 240, discussed herein), the system may then launch the appropriate target application upon receiving indication of an input from the input device.

Turning to the preview area 220 of page 203 in further detail, the preview area 220 may include one or more types of elements (e.g., contents). As described herein, the preview area 220 may be displayed by either by the menu application 142 and/or one or more of the page applications 140. For clarity of explanation, and as described further herein, in a case where the menu application 142 displays the preview area 220, it should be understood that this corresponds to the menu application 142 displaying a copy of the preview area 220 in a window of the viewing area 202. For example, the menu application 142 may present the copy of the preview area 220 based on contents that have been pre-fetched by the CMCS. Subsequently, upon determining an occurrence of a trigger event (e.g., an elapse of a predefined time period), the page application 140 may display the preview area 220 of the page 203, for example, in the same location (e.g., a window) where the copy of the preview area 220 was displayed by the menu application 142. As described further herein, an overlay function (e.g., a crossfade technique) may be used to transition between presentation of the preview area 220 by the menu application 142 and the page application 140.

Each type of element in the preview area 220 may have one or more instances, and each instance may be arranged and displayed in a particular location within the viewing area 202. Details regarding the type and/or arrangement for each element that is displayed within the preview area 220 of a page 203 may be specified (e.g., defined) by a presentation template 221 (e.g., which may be similar to presentation template 152). In an example where the CMCS is executing within the menu application 142 of FIG. 1, the menu application 142 may use the presentation template 221 (e.g., corresponding to presentation template 152 of FIG. 1, which may be associated with page application 140) to determine types and/or arrangements of elements for presentation within the preview area 220. For example, as depicted in FIG. 2, the presentation template 221 may define that the preview area 220 may include one or more items (e.g., the item 1 222, the item 2 224, the item 3 226, and the item 4 228) arranged in a row. In one embodiment, each element (e.g., item) type corresponds to a selectable tab (e.g., a clickable link), whereby a user may select the tab to navigate to another page. For example, each of items 1-4 may correspond to links to different pages that all are associated with the same (or different) target application associated with selected icon 214 (e.g., video game application 146). Each of the different pages may have their own respective preview area and body area, and the preview area for each of the different pages may be specify by different (or the same) presentation templates. In the example depicted in FIG. 2, the preview area for the page 203 corresponding to item 1 222 (e.g., currently selected) is displayed.

In another example of a different type of element defined by presentation template 221, the preview area 220 may contain one or more tiles (e.g., tile 230). In one example, the tile 230 may correspond to a poster image (e.g., a movie poster image, a video game poster image, etc.). In some examples, a tile may further specify and/or display other sub-elements (e.g., text, buttons, images, a thumbnail for a video, audio clip thumbnail, etc.). For example, tiles 232, 234, 236, and 238 may each correspond to thumbnails for videos.

In some embodiments, different elements within the preview area 220 (or body area 240) may be associated with different target applications. For example, icon 214 may be associated with the video game application 146, and the page application 140 may be configured to present the page 203 about the video game application 146. In this example, the tile 232 may link to another target application (e.g., the video application 148), which may launch a video clip about the video game application 146. Also, the tile 234 may link to the video game application 146, which may launch the video game application 146 to be played.

In some embodiments, and as described further herein, one or more elements may not be initially presented in the preview area 220, but may later be presented in the preview area 220 (e.g., to improve performance, by not requiring that the one or more elements be initially loaded and/or rendered). For example, selectable tabs (e.g., the items 1-4 (222, 224, 226,228)) may not be initially displayed within the preview area 220 (e.g., to improve performance). However, upon the system receiving an indication of a trigger event (e.g., an elapsed predefined time interval, a scroll to the body area 240, a scroll back up to the preview area 220), the system may thereafter render the elements (e.g., rendering the selectable tabs) within the preview area 220. In another embodiment, one or more elements may be initially presented in the preview area 220, and, upon receiving indication of a trigger event, the one or more elements may disappear (or continue to be presented) from the preview area 220. For example, the user may scroll down to the body area 240, and then scroll back up to the preview area 220. In this example, upon scrolling back up to the preview area 220, the preview area 220 may no longer display one or more of the elements (e.g., a poster image) that was initially displayed in the preview area 220. In yet another embodiment, the content for any of the elements within the preview area 220 (and/or the body area 240) may be dynamically updated (e.g., updating a tile with a new image, text for a news event, etc.), for example, upon receiving indication of a trigger event.

It should be understood that any suitable type of elements, arrangement, and/or cadence for display of elements within the preview area 220 may be defined by a presentation template. Also, there may be any suitable number of predefined presentation templates. For example, the presentation template 221 for the preview area 220 of the page 203 that is associated with the target application corresponding to the icon 214 may be different (or the same) than a presentation template for another preview area of another page that is associated with another target application corresponding to the icon 216.

It should also be understood that, although different pages may use the same presentation template, the underlying sources of contents that are presented according to the presentation template may be different for each page. The sources of data content (e.g., in a local storage on the computer system 110 and/or uniform resource identifiers (URIs)) for each page (e.g., including the preview area 220 and/or body area 240) may be specified in any suitable fashion. For example, the CMCS may receive as input a source manifest (or script, code, etc.) in addition to a presentation template (e.g., presentation template 221). The source manifest may indicate particular locations to retrieve data contents from, and the presentation template 221 may indicate how to arrange the contents (e.g., dimensions, color, contrast, etc.) within the preview area 220 for presentation. In one example, the presentation template 221 may indicate that all elements of the preview area 220 must be fully presented within the viewing area 202. In another example, the presentation template 221 may indicate that one or more of the elements of the preview area 220 may be only partially presented within the viewing area 202 (e.g., it may overlap with the initially non-visible body area 240).

In some embodiments, the presentation template 221 may be predefined so as to constrain the number and/or types of elements that may be presented within the preview area. For example, the presentation template 221 may prohibit auto-playing of video links (e.g., in a tile), which may typically take a longer amount of time to load and render than other elements (e.g., text). In another example, the presentation template 221 may assign each element (e.g., the item 1 222, the tile 230, the tile 232, etc.) a cost. The number of elements allowed for loading and presentation may be constrained to be under the total allowable cost. In this way, and as described further herein, the system may improve the performance for loading a page. For example, when the system initially loads the page 203, the system may initially only load and present contents corresponding to the presentation template 221 for the preview area 220 (e.g., instead of loading data for all the elements of the page, including the body area 240). In some embodiments, by utilizing predefined templates for the preview area 220, the system may present the preview area 220 for the page 203 in less than or equal to a predefined amount of time that corresponds to a performance goal (e.g., 200 milliseconds (ms), 500 ms, etc.). Accordingly, the system may improve GUI 201 responsiveness, for example, as the system receives user selections of different icons in the menu 210 (e.g., scrolling between icons). As the system shifts focus between icons, a new page preview 220 may be quickly presented to the GUI 201.

Turning to the body area 240 of page 203 in further detail, as described earlier, the body area 240 may contain additional contents of page 203 that were not initially presented within the preview area 220. As described above, in some embodiments, the body area 240 of page 203 is presented by the page application corresponding to page 203 (e.g., page application 140). As depicted in FIG. 2, the body area 240 may contain one or more tiles, which may be similar (or different) types of tiles as described above. For example, tiles 242, 244, 246, and 248 may respectively correspond to video thumbnails. Tiles 250 and 252 may be larger video thumbnails that may be of higher video resolution, and/or may be of significant interest to most users. It should be understood the body area 240 may contain multiple (e.g., many) content elements, and thus, may require multiple levels (e.g., pages) of scrolling via scroll bar 211. It should be understood that, although the contents presented within the body area 240 may be similar (or different) types as those defined by the presentation template 221, the presentation template 221 defines contents for presentation within only the preview area 220. In some embodiments, another one or more templates (separate from presentation template 221) may be used to define the types and/or arrangement of elements that are presented in body area 240.

As described above, in one embodiment, the menu application 142 may present the preview area 220 of the page 203. Subsequent to the menu application 142 presenting the preview area 220, the system may detect an occurrence of one or more trigger events. For example, the system may detect that a user request corresponding to scrolling down the page, and then back up to the top of the page. In this example, when the system detects that the user has scrolled back to the top of the page, the page application 140 (e.g., instead of the menu application 142) presents the preview area 220 of the page 203. The page application 140 may also present at least a portion of the body area 240 of the page 203, as described further in reference to FIG. 3.

Figure 3:
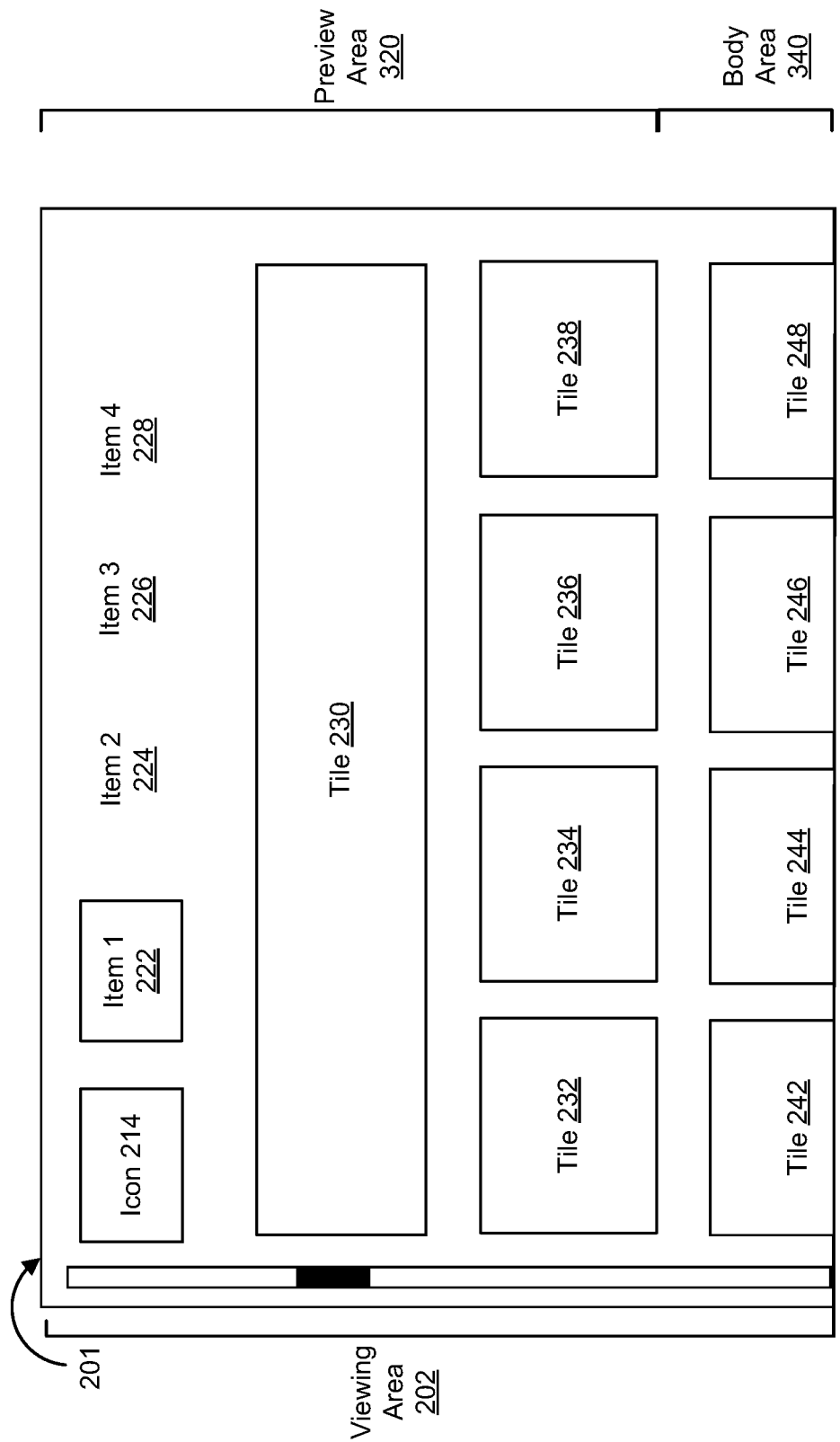
FIG. 3 illustrates another example of a computer system that presents a portion of a page, according to an embodiment of the present disclosure.

FIG. 3 illustrates another example of a page as presented on the GUI 201 of FIG. 2, according to embodiments of the present disclosure. Similar to FIG. 2, the GUI 201 includes the same viewing area 202, such as a presentation area that can be viewed by a user. The scrollbar is also visible within GUI 201, similar to FIG. 2. In FIG. 3, the GUI 201 has been updated based on one or more trigger events that have occurred, subsequent to the initial presentation of the preview area 220 in FIG. 2.

In one embodiment, following the initial loading and presentation of the preview area 220 of the page 203 from FIG. 2, the system receives an indication that a trigger event has occurred. For example, the system receives an indication of a user input (e.g., a user request) corresponding to scrolling down via the input device. In this example, the system may subsequently present an updated preview area 320 and/or body area 340 which may be a portion (e.g., subset) of the body area 240 of the page 203 of FIG. 2. Turning first to the body area 340 in more detail, upon receiving the user request, the system may process additional content that was not originally processed for presentation in the preview area 220. For example, this may involve one or more of downloading additional content over a network, loading the content into local memory, or rendering the content to the body area 340. For example, the system may load contents for the tiles 242, 244, 246, and 248, which were not originally displayed in preview area 220. In some embodiments, as depicted in FIG. 3, the contents for the tiles 242, 244, 246, and 248 may be loaded for presentation even though the tiles may only partially be displayed in viewing area 202. In some embodiments, any additional content that corresponds to content to be within body area 240 may be processed in any suitable fashion, subsequent to the presentation of content within the initial preview area 220 of FIG. 2. For example, in one embodiment, only the contents required for rendering for the particular user request (e.g., scrolling down) may be loaded (e.g., the tiles 242, 244, 246, and 248). In another embodiment, all the contents for the remainder of the page 203 (e.g., including the tiles 250 and 252 of FIG. 2) may be loaded, even though they may not be immediately rendered for the particular user request. Accordingly, as described above, the system may improve GUI responsiveness and reduce processing latency by delaying the processing of additional contents associated with the body area 340.

Turning next to the preview area 320 in more detail, in some embodiments, the preview area 320 may correspond to an updated presentation of a subset of the elements of the preview area 220 of the page 203 of FIG. 2. The updated presentation may be based on a trigger event. Continuing with the example above, where the trigger event may correspond to an indication of the user scrolling down the page, the tiles 230, 232, 234, 236, and 238 may continue to be visible within the preview area 320. If the user were to continue to scroll down, then one or more elements (e.g., all of the tiles) of the preview area 320 would no longer be visible.

Additionally, as depicted in FIG. 3, the items 1-4 (222, 224, 226, and 228) remain visible, but have shifted up to the top of the screen. In other embodiments, as described above, the items 1-4 (222, 224, 226, and 228) may not have been initially visible upon initially loading the preview area 220 of FIG. 2, but may become visible (as depicted in FIG. 3) upon receiving the user request for more information (e.g., scrolling down and/or scrolling back up). In yet other embodiments, the items 1-4 (222, 224, 226, and 228) may not be displayed at all (e.g., both initially, and upon receiving the user request for more information).

It should be understood that, in general, a preview area of a page (e.g., the page 203) contains sufficient content that allows a user to preview a page within a viewing area (e.g., the viewing area 202). A presentation template defines (e.g., constrains) the content that should appear in the preview area of the page. A body area of the page may include all remaining information that is relevant to a target application, which was not included in the preview area of the page. Accordingly, in some embodiments, the content for the preview area may already be available in local memory of the system (e.g., pre-fetched according to the presentation template) by the time an icon is selected from the menu. This may allow the system to reduce latency by retrieving the data from the local memory (instead of one or more remote sources) for presenting the preview area. In contrast, the contents for the body area of the page may be fetched in real-time (e.g., or on-demand) from remote sources following the occurrence of one or more trigger events. In some embodiments, the contents for the body area are not constrained (e.g., defined) by the presentation template that is used to define the preview area.

As described above, note that in this example, all of the icons from the menu 210 have disappeared except for the icon that was selected (e.g., the icon 214). In this case, the icon 214 has move to the upper left quadrant of the viewing area 202. In another embodiment, the entire menu (e.g., including icons) may be removed. In yet another embodiment, the entire menu may remain visible, even upon scrolling down and/or scrolling back up the page.

As described herein, a trigger event may correspond to any suitable event that prompts the system to update one or more elements of a page (e.g., page 203). For example, in some embodiments, a trigger event may correspond to an indication of a user input to navigate a portion of the page (e.g., scrolling down to the body area 340, scrolling back up to the preview area 320). In some embodiments, a trigger event may correspond to an indication of an elapse of a predefined time period. For example, upon initially loading and presenting the preview area 220 of FIG. 2, after a predefined time period elapses (e.g., 200 milliseconds, 500 milliseconds, etc.), even if the system has not yet received further user input (e.g., indication of a click or a scroll), the system may determine to load at least a portion of the remaining contents of body area 240 into local memory (although not yet presenting the body area 240). In this way, in some embodiments, even though the user may not yet have taken action to navigate the page, the system may anticipate a future user action (e.g., scrolling down), and may pre-fetch elements of the body area 240 into local memory (e.g., from remote sources). This may help improve GUI responsiveness when presenting a portion of the body area 240 (e.g., body area 340) at a later time.

In some embodiments, the process of rendering updates to the GUI 201 may be performed in any suitable fashion. For example, as described above, a crossfading transition process may be performed when updating the preview area (e.g., from preview area 220 to preview area 320) and/or body area based on any suitable trigger event. For example, the original icons 212, 214, 216, and 218 may be faded out, while icon 214 may be faded in and positioned in a new location. Also, as discussed further herein, in some embodiments, the GUI 201 may be updated based on a change in the application that renders a preview area of a page. For example, in one embodiment, the menu application 142 may present a window at a location in the GUI 201 corresponding to the preview area 220 of page 203. The window may include the contents of the preview area 220. Subsequent to rendering the preview area 220, a trigger event may be detected by the system (e.g., an elapse of a predefined time period). Upon the detection of the trigger event, the page application 140 may present the preview area 220 that corresponds to page 203. This presentation of the preview area 220 by the page application 140 may cause the preview area 220 to be updated (e.g., via a crossfade technique), even if there are no visible movements of elements within the viewing area 202 (e.g., to a human eye). For example, the menu application 142 may first render the preview area 220 (e.g., upon detecting the selection of a menu icon), and then the page application 140 may subsequently render the preview area 220 (e.g., overlaid on top of the window corresponding to preview area 220 originally displayed by the menu application 142) upon detecting an occurrence of a trigger event. In some embodiments, the system may utilize a crossfade technique to perform the overlaying process.

Figure 4:
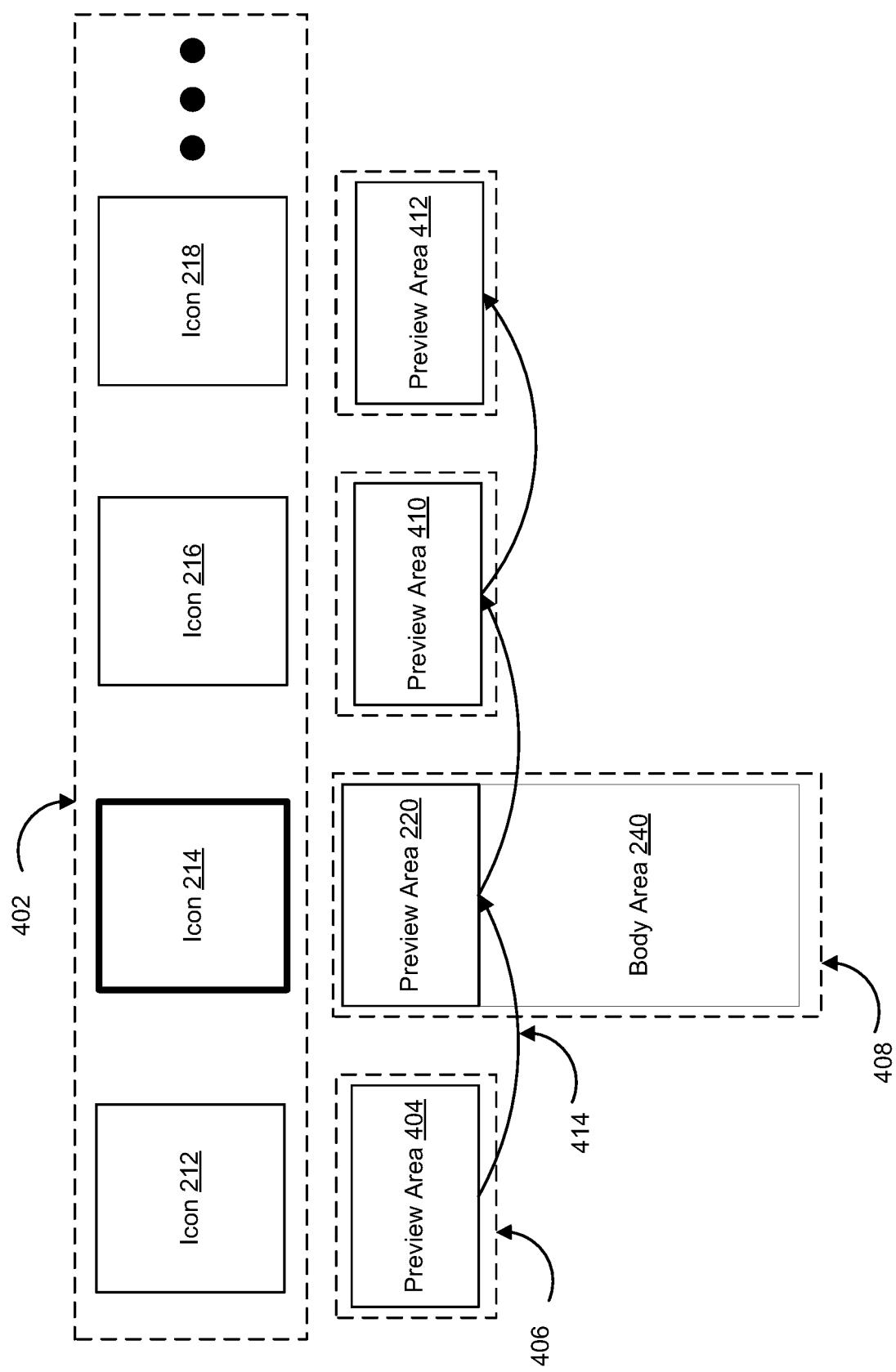
FIG. 4 illustrates an example of a computer system presenting portions of different pages, according to embodiments of the present disclosure.

FIG. 4 illustrates an example of a computer system presenting portions of different pages (e.g., preview areas and/or body areas) and/or a menu within a GUI, according to embodiments of the present disclosure. In some embodiments, the GUI may be similar to GUI 112 of FIG. 1 and/or GUI 201 of FIG. 2 and FIG. 3. The portions of pages and/or menu may be displayed in a viewing area of the GUI, which may be similar to viewing area 202 of FIG. 2.

Turning to FIG. 4 in further detail, different applications are depicted with dash-line boxes, and the elements (e.g., tiles, icons) being presented by the respective applications are depicted with solid-line boxes. For example, a menu application 402 (which may be similar to menu application 142 of FIG. 1) may be responsible for presenting icons (e.g., 212, 214, 216, and 218) in the GUI. A page application 406 may be responsible for presenting a preview area 404 of a page that corresponds to the icon 212. The page application 406 may also be responsible for presenting the body area of the page corresponding to icon 212 (not depicted). In an example, the icon 212 may correspond to a target application such as the library application 144 of FIG. 1. Similarly, page application 408 may be responsible for presenting the preview area 220 of a page (e.g., page 203, as depicted in FIG. 2) that corresponds to the icon 214. The page application 408 406 may also be responsible for presenting the body area 240 of the page 203 corresponding to the icon 214. Using an earlier example, the icon 214 may correspond to the video game application 146. Also, another page application may be responsible for presenting a preview area 410 (e.g., corresponding to the icon 216), and yet another page application may be responsible for presenting a preview area 412 (e.g., corresponding to the icon 218).

As described herein, each of the preview areas (e.g., 404, 220, 410, and 412) of the respective pages may present a preview about a target application (e.g., one of the target applications 144, 146, 148, or 150 of FIG. 1). In the embodiment depicted in FIG. 4, each preview area is presented by a corresponding page application. Upon the system detecting an occurrence of a trigger event, the page application for the respective page may further present at least a portion of the body area of the page. For example, consider a scenario where the user boots and/or logs in to the computer system. Upon logging in, the menu application 402 may display the menu and the page application 406 may simultaneously display the preview area 404 of a respective page corresponding to icon 212. In this example, the icon 212 may be initially selected by default (e.g., as the leftmost icon in the menu). It should be understood that any suitable icon may be selected by default. Upon the system receiving an indication of a trigger event, the system may execute the page application 408 to present preview area 220 within the viewing area. In FIG. 4, this trigger event is depicted by transition 414, whereby the system may receive an indication of a user input to scroll to the next icon (e.g., the icon 214), which is shown as being currently selected, following the transition 414. Note that upon initially presenting the preview area 220, no processing (e.g., pre-fetching) has occurred with respect to body area 240. In this way, the system may improve UI responsiveness upon transitioning between the presentation of preview area 404 and preview area 220. In one embodiment, another trigger event may occur (e.g., an elapsed time period from which the preview area 220 was originally displayed). Upon the occurrence of this trigger event, the page application 408 may subsequently load and/or present at least a portion of the body area 240 of the page 203. The user may subsequently navigate to the icons 216 and 218, which may respectively correspond to transitions to the preview area 410 and the preview area 412. It should be understood that the system may transition back and forth between different preview areas of pages (e.g., based on user input received from the input device). By loading and presenting only the preview area for each transition, the system may improve UI responsiveness and reduce processing latency for presenting each page. As described herein, the system may also improve GUI responsiveness based on pre-fetching the data for each of the preview areas (e.g., 404, 220, 410, and 412) to be stored in local memory on the system. In some embodiments, this pre-fetching may be performed prior to receive input from an input device (e.g., indicating a selection of an icon, a transition to select another icon, etc.). In this way, the system may quickly retrieve from local memory on a single device (e.g., not over a network and/or from multiple sources) the contents that are used to present the one or more preview areas defined by respective presentation templates.

In another embodiment, instead of a page application being responsible for initially presenting a preview area of a page, the menu application may initially present the preview area. For example, the menu application 402 may be responsible for presenting the preview area (e.g., within a window of the GUI) for any one or more of the pages (e.g., preview area 404, preview area 220, etc.). In this embodiment, although the menu application 402 presents the initial preview area for each page, the body area for each page is presented by the respective page application. Additionally, the respective page application (e.g., page application 408) may also be responsible for presenting updates to the preview area upon detecting an occurrence of a trigger event. 220 (e.g., similar to preview area 320 of FIG. 3). The system may transition between execution of applications (and/or services) and presentations of areas utilizing any suitable technique, as described herein (e.g., overlaying and/or cross-fading).

It should be understood that any suitable combination of applications and/or services may be used to perform embodiments for presenting the preview area and/or body area of one or more pages, as described herein. For example, in one embodiment, a single page application may be executed to present more than one preview area (and/or body area). For example, using FIG. 4 for illustration, page applications 406 and 408 may be combined together into one page application, and the combined page application may be responsible for displaying preview areas 404 and 220 (and/or body areas).

Figure 5:
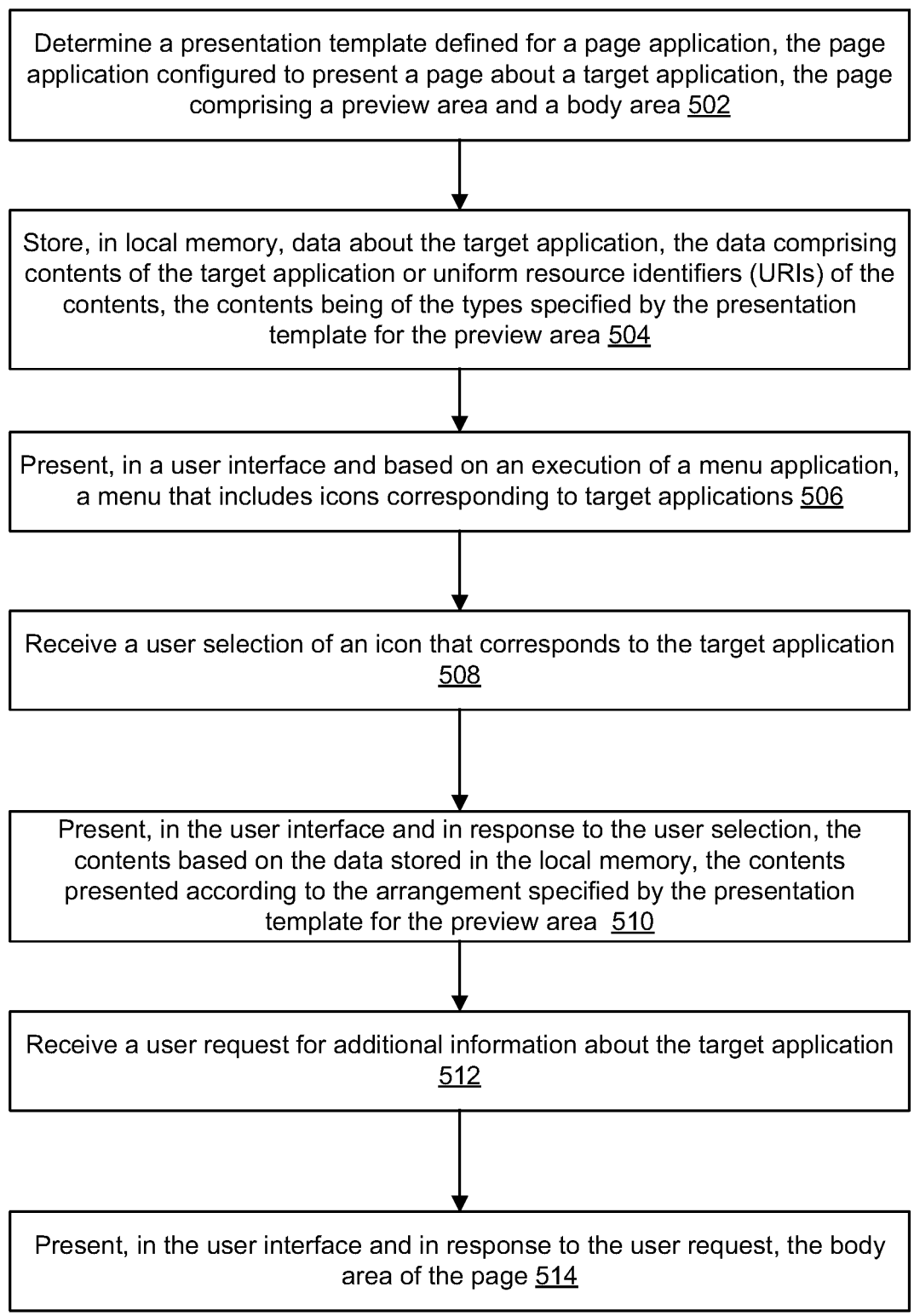
FIG. 5 illustrates an example flow for previewing and presenting content of different applications in a user interface, according to embodiments of the present disclosure.

FIG. 5 illustrates an example of a flow for previewing and presenting content of a page within a GUI, according to embodiments of the present disclosure. The operations of the flow can be implemented as hardware circuitry and/or stored as computer-readable instructions on a non-transitory computer-readable medium of a computer system, such as a video game console and/or a video game platform. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required and that certain operations can be omitted.

In an example, the flow includes operation 502, where the computer system determines a presentation template defined for a page application. In some embodiments, the page application may be configured to present a page about a target application (e.g., a user application or system application). In some embodiments, the page may include different portions (e.g., a preview area and a body area). In an example, the presentation template, the page application, the target application, and/or the portions of the page may be similar to as described in reference to FIGS. 1-3.

In an example, the flow includes operation 504, where the computer system stores, in local memory, data about the target application. In some embodiments, the data includes contents of the target application or uniform resource identifiers (URIs) of the contents. The contents may be of the types specified by the presentation template for the preview area. For example, as described herein, upon booting the system and/or logging in a user, the computer system may pre-fetch (e.g., download) data from one or more sources (e.g., a service platform in the cloud, a third-party content provider) to the local device (e.g., computer system 110 of FIG. 1). In some embodiments, the data may already be stored on the local device (e.g., metadata of a target application). The pre-fetched data may be stored in the local memory, such as a permanent storage (e.g., a HDD and/or SSD) of the local device. The contents may correspond to any suitable contents, as described herein (e.g., text, images, video thumbnails, audio clips, etc.). In some embodiments, the contents may also include a URI, which may be a uniform resource locator (URL). In this example, the URL itself may be data that is stored locally, for later downloading. In some embodiments, all the contents needed to later present the preview area may be first pre-fetched and stored in the local memory, so that no future data retrieval external to the local device (e.g., over a network) is required. In some embodiments, this may enable the system to improve performance when loading content for presenting the preview area of the page.

In an example, the flow includes operation 506, where the computer system presents, in a user interface and based on an execution of a menu application, a menu that includes icons corresponding to target applications. In some embodiments, the user interface may be similar to as described in reference to the GUI 201 of FIG. 2, and the menu may be similar to as described in reference to the menu 210 of FIG. 2.

In an example, the flow includes operation 508, where the computer system receives a user selection of an icon that corresponds to the target application. For example, the user selection may correspond to a signal input received by the computer system from an input device (e.g., a video game controller, keyboard, etc.). The signal may indicate that the user has selected the icon among the other icons in the menu. In some embodiments, the target application may correspond to any suitable application, such as described in reference to FIG. 1 (e.g., a media application, video game application, or a system application).

In an example, the flow includes operation 510, where the computer system presents, in the user interface and in response to the user selection, the contents based on the data stored in the local memory. The contents may be presented according to the arrangement specified by the presentation template for the preview area, for example, as described in reference to FIG. 2-4.

In an example, the flow includes operation 512, where the computer system receives a user request for additional information about the target application. In some embodiments, the user request may correspond to another signal received by the computer system from the input device. For example, the user request may correspond to a signal that is sent by the input device to the system upon receiving a click of a button on the input device (e.g., for scrolling down the page), or other suitable input that is an active request. In another embodiment, the user request may be a passive request. For example, the user request may correspond to an elapse of a predefined time period (or interval). For example, the predefined time period may be 200 ms, 500 ms, 1 second, etc. In some embodiments, the predefined time period may be defined according to an expected amount of time that is a likely indicator of a user having some interest in receiving more details about the page (e.g., from the body area).

In an example, the flow includes operation 514, where the computer system may present, in the user interface and in response to the user request, the body area of the page. In some embodiments, the body area may be presented based on an execution of the page application. In some embodiments, this operation may be similar to as described in reference to FIGS. 3 and 4.

Figure 6:
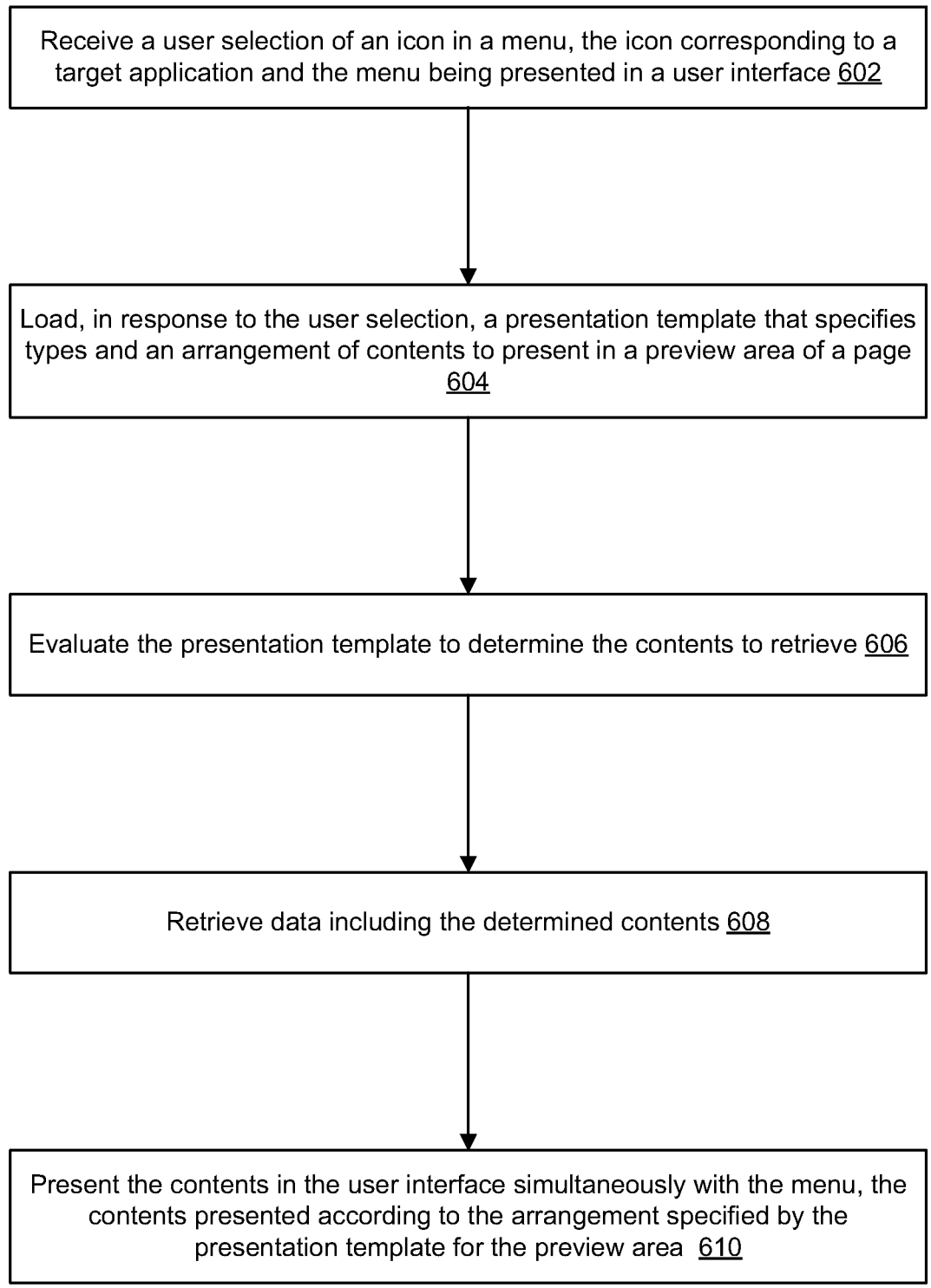
FIG. 6 illustrates an example flow for presenting a preview area of a page, according to embodiments of the present disclosure.

FIG. 6 illustrates an example of a flow for presenting a preview area of a page within a GUI, according to embodiments of the present disclosure. In some embodiments, any one or more of the operations of FIG. 6 may be performed by a menu application (e.g., menu application 142) or a page application (e.g., page application 140) of the system, as described herein. As described herein, the page application may be configured to present a page about a target application.

In some embodiments, prior to the commencement of the flow at operation 602, the system may have pre-fetched and stored data in local memory about the target application and/or about a page application (e.g., similar to operation 504 of FIG. 5). In some embodiments, this pre-fetching may be performed by a CMCS executing on the system (e.g., in a menu application, in a page application, or other system service). For example, in one embodiment, upon the system boot being completed and/or a log-in of a user being completed, the system may pre-fetch and store data corresponding to presentation templates defined for the page application in local memory on the local device. For example, the system may pre-fetch (e.g., download over a network) presentation templates from a service platform (e.g., a video game service platform) and store the templates on a HDD (or SSD) of the local device. In another example, the system may also pre-fetch new (or updated) data corresponding to contents that may be displayed in a preview area of a page, whereby the presentation templates may define types and arrangements of contents to be presented in the preview area of the page. In some embodiments, some of the contents that should be displayed in the preview area of the page may not be pre-fetched, as described below.

In an example, the flow includes operation 602, where the computer system receives a user selection of an icon in a menu. The icon may correspond to a target application and the menu may be presented in a user interface. In some embodiments, this operation may be similar to operation 508 of FIG. 5.

In an example, the flow includes operation 604, where the computer system loads, in response to the user selection, a presentation template. For example, the system may load the presentation template that was stored on the HDD (or SSD) of the local device (prior to operation 602) into non-permanent storage of the local memory (e.g., RAM). The particular presentation template loaded may correspond to the page application that is associated with the selected icon (and/or the target application). In some embodiments, the process of loading the presentation template into non-permanent local memory may take less than 100 ms, 200 ms, or 500 ms.

In an example, the flow includes operation 606, where the computer system evaluates the presentation template to determine the contents to retrieve. For example, based on the loaded presentation template in RAM, the system may evaluate (e.g., parse) the presentation template to determine the types of content and arrangements of content to be presented in the preview area of the page. The presentation template may utilize any suitable format and/or programming language (e.g., Extended Markup Language (XML), C#, JavaScript, etc.

In an example, the flow includes operation 608, where the computer system retrieves data including the determined contents. As described above, in some embodiments, the system may have already pre-fetched some or all of the data that includes the determined contents (e.g., text elements, images, etc.), and thus, the system may retrieve (e.g., fetch) the data from a permanent storage on the local device (e.g., a HDD or SSD) to non-permanent storage on the local device (e.g., RAM). In other embodiments, the system may have stored URIs (e.g., URLs) that link to a portion of the data. In this case, the system may retrieve the data via the one or more URLs by download the data via the URL and storing the data in local memory (e.g., RAM).

In an example, the flow includes operation 610, where the computer system presents the contents in the user interface simultaneously with the menu. In some embodiments, the contents may be presented (e.g., rendered) according to the arrangement specified by the presentation template for the preview area. In some embodiments, this operation may be similar to operation 510 of FIG. 5.

Figure 7:
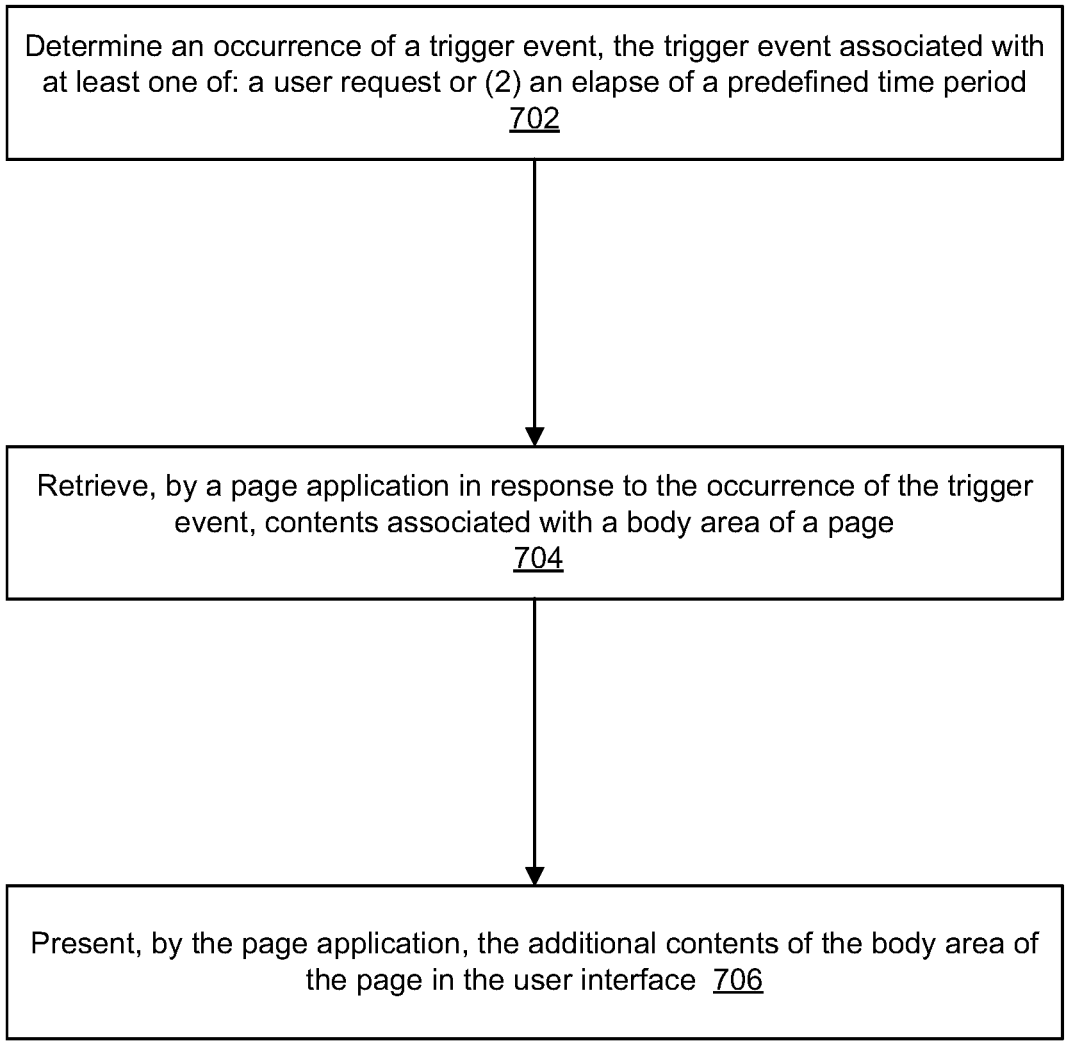
FIG. 7 illustrates an example flow for presenting a body area of a page, according to embodiments of the present disclosure.

FIG. 7 illustrates an example of a flow for presenting additional contents of the body area of a page within a GUI. In some embodiments, any one or more of the operations of FIG. 7 may be performed by a page application (e.g., page application 140) of the system, as described herein. In some embodiments, the commencement of the flow at operation 702 may be subsequent to the presentation of a preview area of the page within the GUI, for example, as described in reference to FIG. 6 and/or operation 510 of FIG. 5.

In an example, the flow includes operation 702, where the computer system determines an occurrence of a trigger event. In some embodiments, the trigger event may be associated with at least one of a user request or an elapse of a predefined time period, as described herein. For example, the user request may correspond to a signal received from an input device corresponding to a click of a button on the input device, indicating that the user requests to scroll down the page to see at least a portion of the body area of the page. In some embodiments, the predefined period of time may be any suitable period (e.g., 100 ms, 500 ms, 1 second, 5 seconds, 1 minute, etc.).

In an example, the flow includes operation 704, where the computer system retrieves, by a page application in response to the occurrence of the trigger event, contents associated with the body area of the page. In some embodiments, this operation may be similar to as described in reference to FIG. 3. These contents may be additional contents that were not originally loaded and presented in the preview area of the page, prior to the commencement of the flow. In some embodiments, the contents may be retrieved either from the permanent storage of the local memory (e.g., a HDD and/or SSD) of the device to non-permanent storage (e.g., RAM) of the device. In some embodiments, the contents may be retrieved from an external content source (e.g., a third party system, a service platform associated with the local device, etc.) over a network (e.g., the Internet). In some embodiments, the system may prioritize pre-fetching content for the preview area of the page over pre-fetching content for the body area of the page. This may be due to a higher priority for UI responsiveness when the user is navigating between preview pages as they scroll between icons in the menu.

In an example, the flow includes operation 706, where the computer system may present, by the page application, the additional contents of the body area of the page in the user interface. In some embodiments, this operation may be similar to as described in reference to FIGS. 3 and 4. For example, in some embodiments, only a portion of the body area of the page may be presented in the GUI. Also, in some embodiments, the body area may be displayed in addition to an updated preview area, as depicted in FIG. 3. In some embodiments, the page application may present both the body area and the updated preview area. In some embodiments, the updated preview area may be the same or different elements as the original preview area, as described herein.

Figure 8:
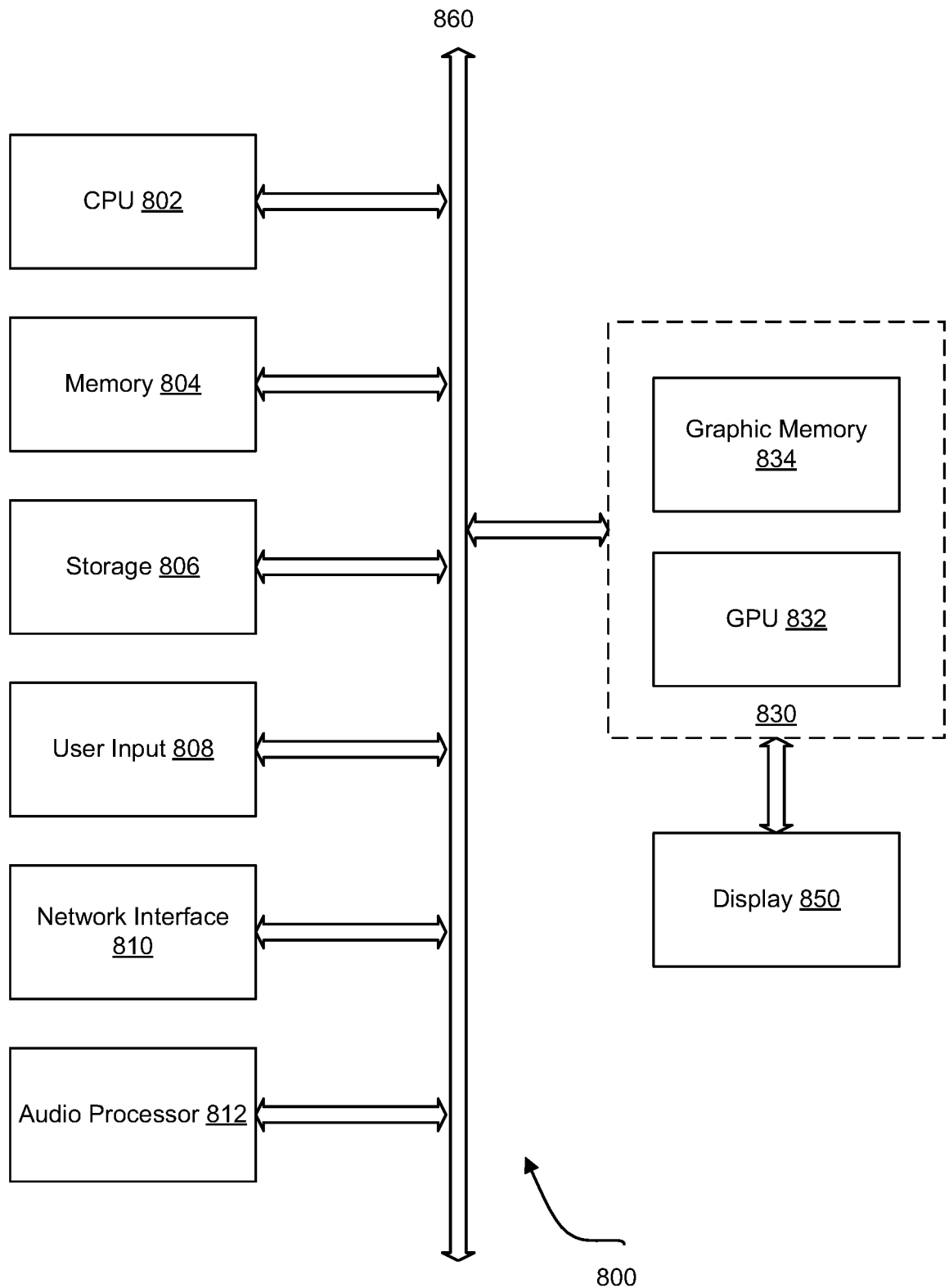
FIG. 8 illustrates an example of a hardware system suitable for implementing a computer system, according to embodiments of the present disclosure.

FIG. 8 illustrates an example of a hardware system suitable for implementing a computer system 800, according to embodiments of the present disclosure. The computer system 800 represents, for example, a video game console, a video game platform, or other types of a computer system.

The computer system 800 includes a central processing unit (CPU) 802 for running software applications and optionally an operating system. The CPU 802 may be made up of one or more homogeneous or heterogeneous processing cores. Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to the computer system 800, examples of which may include keyboards, mice, joysticks, touch pads, touch screens, still or video cameras, and/or microphones. Network interface 810 allows the computer system 800 to communicate with other computer systems via an electronic communications network, and may include wired or wireless communication over local area networks and wide area networks such as the Internet. An audio processor 812 is adapted to generate analog or digital audio output from instructions and/or data provided by the CPU 802, memory 804, and/or storage 806. The components of computer system 800, including the CPU 802, memory 804, data storage 806, user input devices 808, network interface 810, and audio processor 812 are connected via one or more data buses 860.

A graphics subsystem 830 is further connected with the data bus 860 and the components of the computer system 800. The graphics subsystem 830 includes a graphics processing unit (GPU) 832 and graphics memory 834. The graphics memory 834 includes a display memory (e.g., a frame buffer) used for storing pixel data for each pixel of an output image. The graphics memory 834 can be integrated in the same device as the GPU 832, connected as a separate device with the GPU 832, and/or implemented within the memory 804. Pixel data can be provided to the graphics memory 834 directly from the CPU 802. Alternatively, the CPU 802 provides the GPU 832 with data and/or instructions defining the desired output images, from which the GPU 832 generates the pixel data of one or more output images. The data and/or instructions defining the desired output images can be stored in the memory 804 and/or graphics memory 834. In an embodiment, the GPU 832 includes 3D rendering capabilities for generating pixel data for output images from instructions and data defining the geometry, lighting, shading, texturing, motion, and/or camera parameters for a scene. The GPU 832 can further include one or more programmable execution units capable of executing shader programs.

The graphics subsystem 830 periodically outputs pixel data for an image from the graphics memory 834 to be displayed on the display device 850. The display device 850 can be any device capable of displaying visual information in response to a signal from the computer system 800, including CRT, LCD, plasma, and OLED displays. The computer system 800 can provide the display device 850 with an analog or digital signal.

In accordance with various embodiments, the CPU 802 is one or more general-purpose microprocessors having one or more processing cores. Further embodiments can be implemented using one or more CPUs 802 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 155%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for previewing and presenting content of different applications in a user interface, the method implemented by a computer system, the method comprising:

determining multiple presentation templates defined for multiple page applications, wherein each of the multiple page applications is configured to present a page about a corresponding target application, the page comprising a preview area and a body area, the page having a presentation area that is larger than the user interface and being scrollable, the presentation template laying out an arrangement of thumbnails and text information to present in the preview area, the corresponding target application being a user application of the computer system or a system application of the computer system;

storing, in local memory of the computer system, data about the corresponding target application, the data comprising contents of the corresponding target application or uniform resource identifiers (URIs) of the thumbnails and text information to be displayed within the preview area for the corresponding target application;

presenting, in the user interface and based on an execution of a menu application of the computer system, a menu that includes icons corresponding to target applications;

receiving, after the data about the corresponding target application is stored in the local memory of the computer system, a user selection of an icon from the menu that corresponds to a target application;

presenting, in the user interface and in response to the user selection, the preview area of the page defined by the presentation template, including the thumbnails and text information, based on the data stored in the local memory;

receiving a user request for additional information about the target application; and presenting, in the user interface and in response to the user request, the body area of the page about the target application, the body area presented based on an execution of the page application, wherein the body area of the page includes one or more selectable elements related to the target application.

2. The method of claim 1, wherein the preview area and the menu are presented simultaneously in the user interface.

3. The method of claim 2, further comprising:

removing, in response to the user request, the menu from the user interface, wherein the body area is presented in the user interface while the menu is removed from the user interface.

4. The method of claim 1, wherein presenting preview area comprises:

retrieving, by the menu application, the thumbnails and text information based on the data; and presenting, by the menu application, a window at a location in the user interface corresponding to the preview area, wherein the window comprises the thumbnails and text information.

5. The method of claim 4, further comprising:

retrieving, by the page application in response to the user request, the thumbnails and text information based on the data and additional contents for the body area, wherein the body area is presented by the page application by populating the body area with the additional contents;

receiving a second user request for the preview area;

presenting, by the page application in response to the second user request, the preview area at the location in the user interface, the preview area comprising the thumbnails and text information; and presenting, by the menu application, the menu in the user interface simultaneously with the presentation of the preview area.

6. The method of claim 1, wherein presenting the thumbnails and text information comprises:

retrieving, by the page application in response to the user selection, the thumbnails and text information based on the data; and presenting, by the page application, the preview area, wherein the preview area comprises the thumbnails and text information.

7. The method of claim 6, wherein the data is stored by the page application prior to receiving the user selection, and the method further comprising:

retrieving, by the page application in response to the user request, additional contents from one or more content sources, wherein the body area is presented by the page application by populating the body area with the additional contents.

8. The method of claim 1, wherein the menu comprises a second icon corresponding to a second target application that is associated with a second page application, wherein the second page application is configured to present a second page about the second target application.

9. The method of claim 8, further comprising:

storing, in the local memory, second data of the second target application, the second data comprising second contents or second URIs of the second contents;

receiving a second user selection of the second icon;

retrieving the second contents based on the second data; and presenting, in the user interface, a second preview area comprising the second contents.

10. The method of claim 9, wherein the second data is stored based on a second presentation template that is defined for the second page application and that is different from the presentation template defined for the page application, wherein the second contents are presented in the second preview area according to the second presentation template, and wherein the target application and the second target application are of different application types.

11. The method of claim 1, wherein the menu comprises sets of icons, wherein each set corresponds to a different application type, wherein a first set of the sets corresponds to a first application type and comprises the icon based on the target application being of the first application type, and wherein the page application is configured to present a set of pages each of which corresponding to a different target application.

12. The method of claim 11, wherein the preview area is presented by the page application based on the user selection of the icon, wherein the body area is presented by the page application based on the user request for the additional information, and the method further comprising:
receiving a second user selection of a second icon that is included in the first set presented in the menu; and
presenting, by the page application, a second preview area of a second page that corresponds to a second application, the second application being of the first application type.

13. The method of claim 12, wherein the second preview area is presented according to the presentation template.

14. The method of claim 11, further comprising:
receiving a second user selection of a second icon that is included in a second set presented in the menu, the second set corresponding to a second application type; and
presenting, by a second page application, a second preview area of a second page that corresponds to a second application, the second application being of the second application type.

15. The method of claim 1, wherein the icon corresponds to a plurality of target applications, wherein the presentation template is defined for the plurality of target applications, and wherein the page application presents the preview area by populating the preview area with information about the plurality of target applications based on the presentation template.

16. A computer system comprising:
one or more processors; and
one or more memories storing computer-readable instructions that, upon execution by the one or more processors, configure the computer system to:
determine multiple presentation templates defined for multiple page applications, wherein each of the multiple page applications is configured to present a page about a corresponding target application, the page comprising a preview area and a body area, the page having a presentation area that is larger than a user interface and being scrollable, the presentation template laying out an arrangement of thumbnails and text information to present in the preview area, the corresponding target application being a user application of the computer system or a system application of the computer system;
store, in local memory of the computer system, data about the corresponding target application, the data comprising contents of the corresponding target application or uniform resource identifiers (URIs) of the thumbnails and text information to be displayed within the preview area for the corresponding target application;
present, in the user interface and based on an execution of a menu application of the computer system, a menu that includes icons corresponding to target applications;
receive, after the data about the corresponding target application is stored in the local memory of the computer system, a user selection of an icon from the menu that corresponds to a target application;
present, in the user interface and in response to the user selection, the preview area of the page defined by the presentation template, including the thumbnails and text information, based on the data stored in the local memory;
receive a user request for additional information about the target application; and
present, in the user interface and in response to the user request, the body area of the page about the target application, the body area presented based on an execution of the page application, wherein the body area of the page includes one or more selectable elements related to the target application.

17. One or more non-transitory computer-readable media storing computer-readable instructions that, upon execution on a computer system, cause the computer system to perform operations comprising:
determining multiple presentation templates defined for multiple page applications, wherein each of the multiple page applications is configured to present a page about a corresponding target application, the page comprising a preview area and a body area, the page having a presentation area that is larger than a user interface and being scrollable, the presentation template laying out an arrangement of thumbnails and text information to present in the preview area, the corresponding target application being a user application of the computer system or a system application of the computer system;
storing, in local memory of the computer system, data about the corresponding target application, the data comprising contents of the corresponding target application or uniform resource identifiers (URIs) of the thumbnails and text information to be displayed within the preview area for the corresponding target application;
presenting, in the user interface and based on an execution of a menu application of the computer system, a menu that includes icons corresponding to target applications;
receiving, after the data about the corresponding target application is stored in the local memory of the computer system, a user selection of an icon from the menu that corresponds to a target application;
presenting, in the user interface and in response to the user selection, the preview area of the page defined by the presentation template, including the thumbnails and text information, based on the data stored in the local memory;
receiving a user request for additional information about the target application; and
presenting, in the user interface and in response to the user request, the body area of the page about the target application, the body area presented based on an execution of the page application, wherein the body area of the page includes one or more selectable elements related to the target application.

18. The one or more non-transitory computer-readable media of claim 17, wherein the preview area and the menu are presented simultaneously in the user interface, and wherein the body area is presented in the user interface while the menu is removed from the user interface.

19. The one or more non-transitory computer-readable media of claim 17, wherein the data is stored by the page application prior to receiving the user selection, wherein presenting the preview area comprises:

retrieving, by the page application in response to the user selection, the thumbnails and text information based on the data; and presenting, by the page application, the preview area, wherein the preview area comprises the thumbnails and text information, and wherein the operations further comprise:

retrieving, by the page application in response to the user request, additional contents from one or more content sources, wherein the body area is presented by the page application by populating the body area with the additional contents.

20. The one or more non-transitory computer-readable media of claim 17, wherein the menu comprises a second icon corresponding to a second target application that is associated with a second page application, wherein the second page application is configured to present a second page about the second target application.

21. The one or more non-transitory computer-readable media of claim 17, wherein the page is one of a plurality of pages associated with the target application, wherein the preview area is presented in response to the user selection as excluding selectable tabs, and the operations further comprising:

determining a trigger event, the trigger event comprising at least one of: a user navigation to the body area and back to the preview area, or an elapse of a predefined time period;

presenting the selectable tabs within the preview area based on the trigger event, each tab respectively corresponding to navigable links to a particular page of the plurality of pages;

receiving a second user request corresponding to a selection of a tab; and presenting, in the user interface and in response to the second user request, a second body area of a second page of the plurality of pages.

22. The one or more non-transitory computer-readable media of claim 17, the operations further comprising:

presenting a plurality of selectable tabs within the menu, each selectable tab corresponding to a target application category, wherein the target application category is at least one of games or media;

receiving a second user selection for one of the plurality of tabs, the selected tab corresponding to a particular target application category; and presenting, in the menu, a subset of the icons, the subset corresponding to target applications having the particular target application category.

\* \* \* \* \*